(No Model.)

4 Sheets—Sheet 1.

H. HINCKLEY.
Car Brake and Starter.

No. 242,533. Patented June 7, 1881.

WITNESSES
Wm A. Skinkle
Geo. W. Breck.

INVENTOR
Hermon Hinckley.
By his Attorneys
Baldwin, Hopkins, & Peyton (No Model.) 4 Sheets—Sheet 2.
H. HINCKLEY.
Car Brake and Starter.
No. 242,533. Patented June 7, 1881.
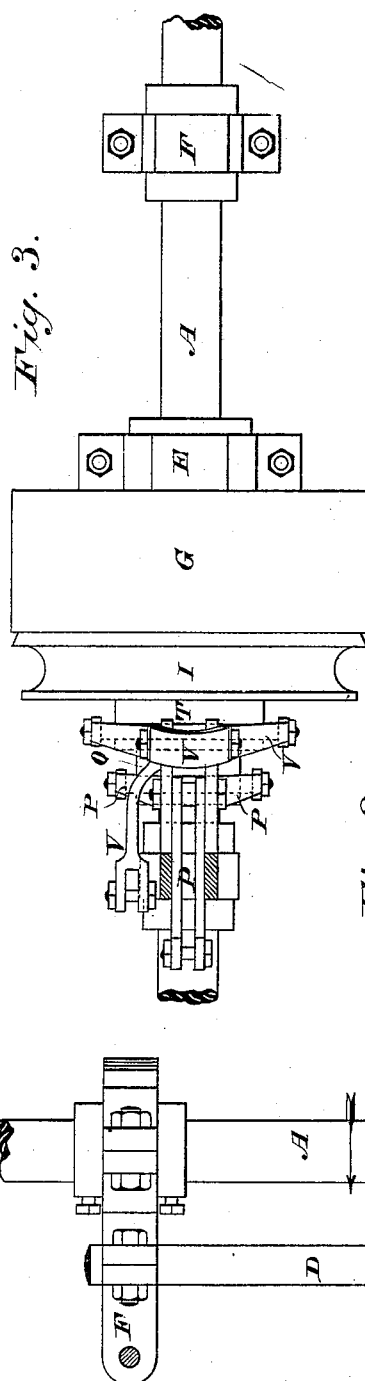
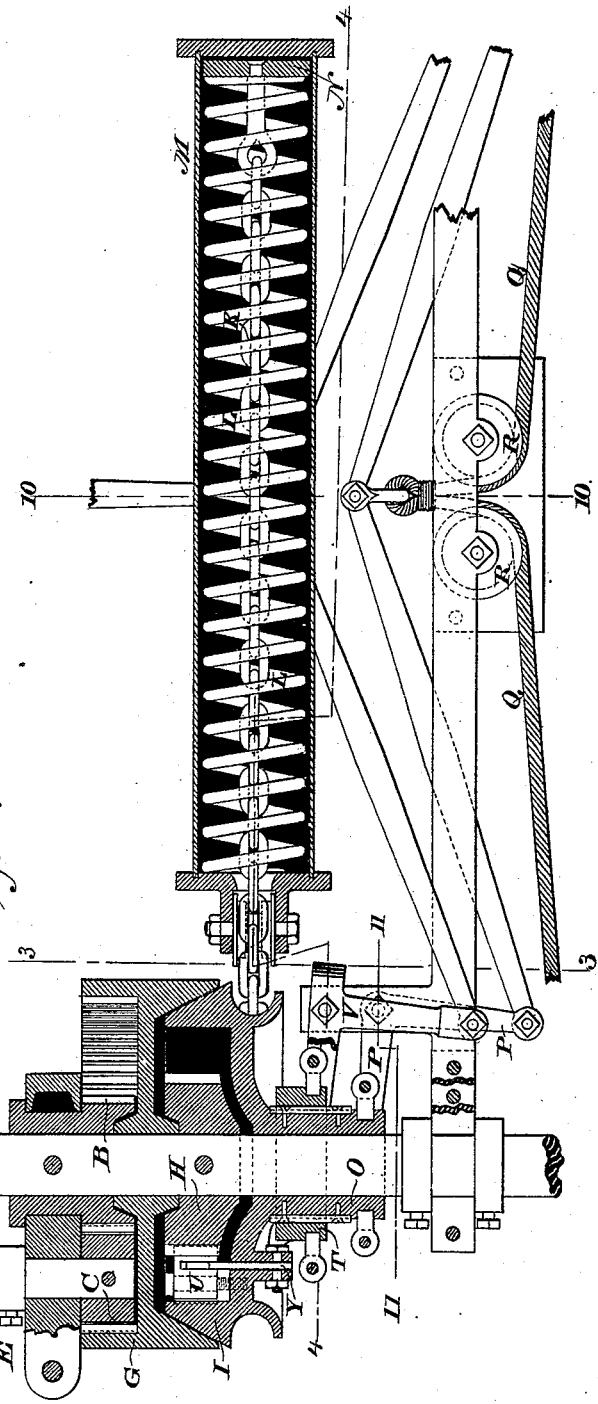
WITNESSES
INVENTOR
Hermon Hinckley.
By his Attorneys
Baldwin, Hopkins, & Peyton.

(No Model.) 4 Sheets—Sheet 3.

H. HINCKLEY.
Car Brake and Starter.

No. 242,533. Patented June 7, 1881.

WITNESSES

INVENTOR
Hermon Hinckley,
By his Attorneys
Baldwin, Hopkins, & Peyton (No Model.) 4 Sheets—Sheet 4.
H. HINCKLEY.
Car Brake and Starter.
No. 242,533. Patented June 7, 1881.

WITNESSES
Wm A. Skinkle
Geo W. Breck.

INVENTOR
Hermon Hinckley,
By his Attorneys
Baldwin, Hopkins & Peyton

UNITED STATES PATENT OFFICE.

HERMON HINCKLEY, OF PHILADELPHIA, PENNSYLVANIA, ASSIGNOR OF ONE-HALF TO EBER CULVER AND NEWTON H. CULVER, OF SAME PLACE.

CAR BRAKE AND STARTER.

SPECIFICATION forming part of Letters Patent No. 242,533, dated June 7, 1881.

Application filed April 6, 1881. (No model.)

*To all whom it may concern:*

Be it known that I, HERMON HINCKLEY, of the city and county of Philadelphia, State of Pennsylvania, have invented certain new and useful Improvements in Car Brakes and Starters, of which the following is a specification.

Figure 1:
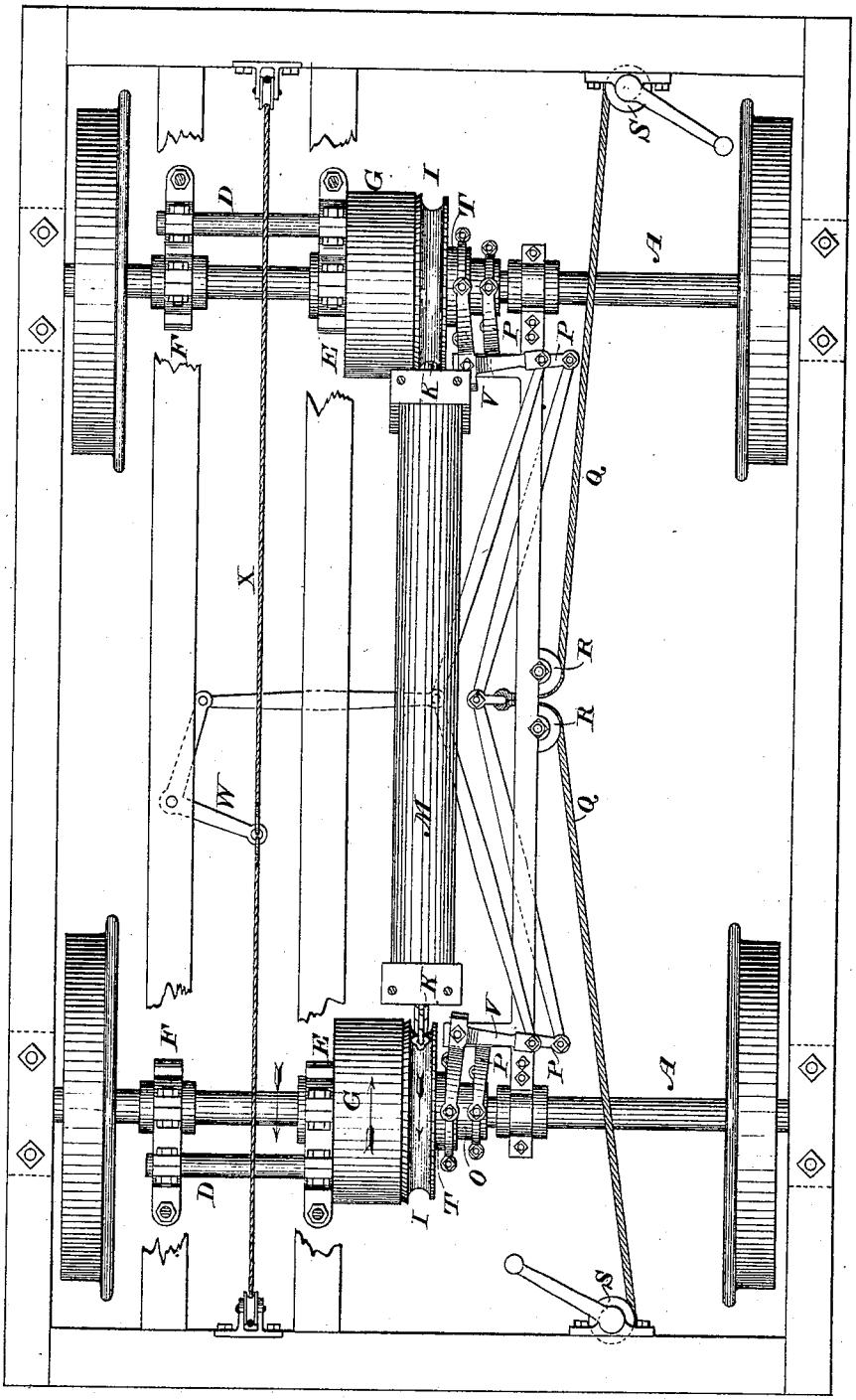
Figure 4:
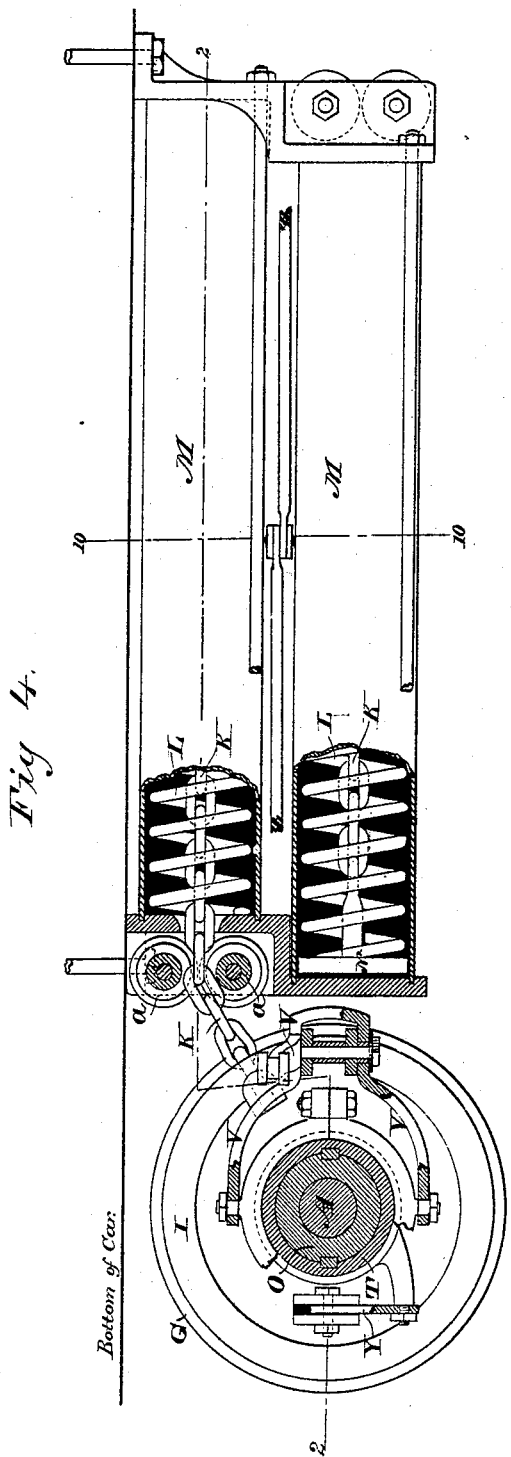
Figure 7:
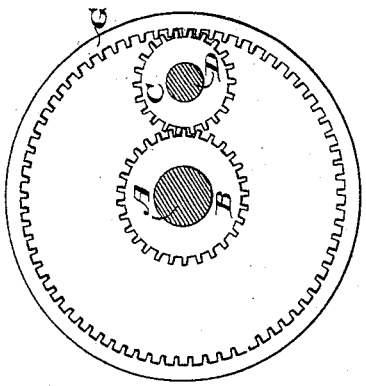
Figure 6:
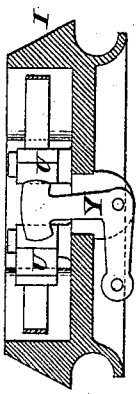
Figure 5:
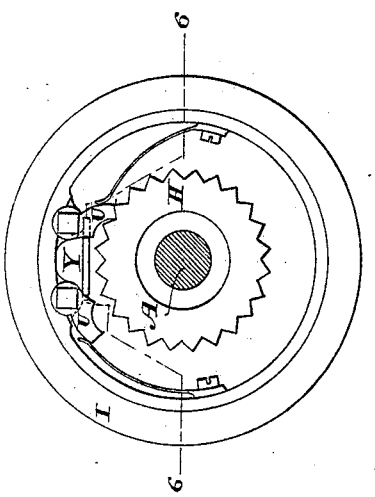
Figure 10:
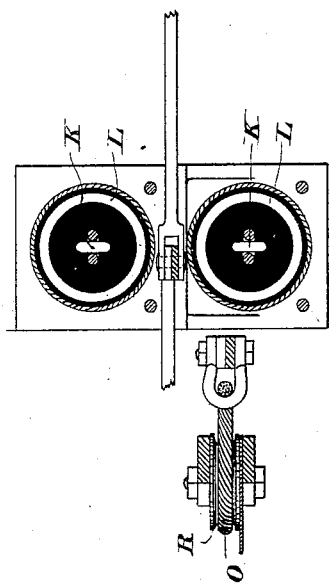
Figure 13:
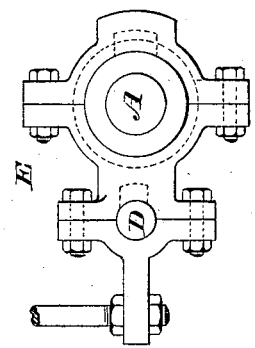
Figure 9:
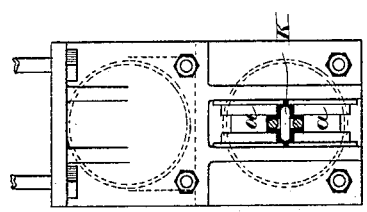
Figure 8:
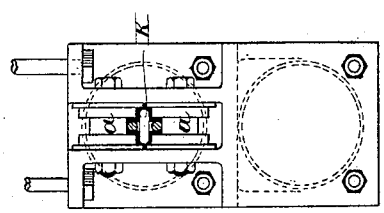
Figure 11:
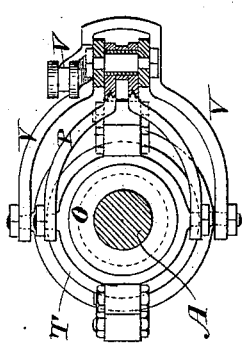
Figure 12:
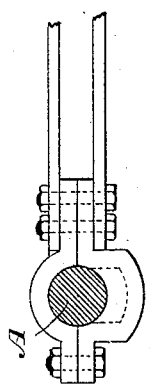

In the accompanying drawings, illustrating my invention as applied to an ordinary street-car, Figure 1 is a plan view embracing a skeleton-frame for the bottom of a street-car. Fig. 2 is a detailed section on line 2 2 of Fig. 4. Fig. 3 is an elevation, partly in section, on line 3 3 of Fig. 2. Fig. 4 is a side elevation, partly in section, through the line 4 4 of Fig. 2. Fig. 5 is an elevation of the ratchet-wheel and spring-pawls. Fig. 6 is a section through the line 6 6 of Fig. 5. Fig. 7 is a detached end view of internally-geared wheels and pinions. Figs. 8 and 9 are end views of chain-drums, showing the chain-guides. Fig. 10 is a transverse section on the line 10 10 of Figs. 2 and 4. Fig. 11 is a section on the line 11 11 of Fig. 2. Fig. 12 is a detached side elevation of the frame-supporting bracket resting on the car-axle. Fig. 13 is a side elevation of one of the shaft-supporting brackets.

My improvements relate to that class of car brakes and starters in which the rotation of car wheels and axles serves to wind up the chain or cable against the action of a spring. It is usually applied in duplicate to cars, so as to act upon both the front and rear wheels and axles; but it may be applied singly to sewing-machines, foot-power lathes, scroll-saws, printing-presses, or any machinery requiring to be frequently stopped and started.

Referring to the letters upon the drawings for a description of my construction of parts in detail, A indicates a car-axle, to which is secured a spur-wheel, B, geared with another spur-wheel, C, secured to a shaft, D, supported in suitable brackets E and F. This spur-wheel C is geared with an internal-gear wheel, G, which runs loosely upon the car-axle, always in the opposite direction to the rotation of the axle.

H indicates a ratchet-wheel secured to the car-axle and within a circular cavity in the chain-wheel I, both of which wheels are within a conical cavity in the side of the wheel G. The chain-wheel has one end of the chain K secured to it, and the other end is secured to the spring L within the fixed spring-cylinder M, at the point N, so that in any direction the chain-wheel may be rotated it will wind up the chain and compress the spring. It is desirable that rotary chain-guides *a a* be provided, as in the drawings. The chain-wheel is provided with a hub, O, and is loose upon the car-axle, and is also provided with shipping mechanism of any ordinary construction, to slide it on the axle and engage it and disengage it by frictional contact within the conical cavity of the wheel G. This mechanism, as shown in the drawings, consists of a bell-crank lever, P, connected by suitable links with a rope, Q, passing over a pulley, R, to the end of the car and around a winch, S. The result is that winding up the winch and pulling upon the rope will slide the chain-wheel into engagement with the wheel G, or unwinding it will effect disengagement.

Secured loosely upon the hub of the chain-wheel is a slide-ring, T, for the purpose of simultaneously operating the spring-pawls U U, which alternately engage with the ratchet H by the shifting of the ring to and fro in the direction of the axis of the car-axle. The mechanism for shipping this ring T, as shown in the drawings, consists of a bell-crank lever, V, and suitable links connecting with another bell-crank lever, W, to which is attached a rope, X, leading around a pulley to the end of the car within reach of the driver, so that by pulling upon the rope at one end of the car the driver will set one of the spring-pawls into engagement with the ratchet, and by pulling upon the rope at the opposite end he will set the other pawl into engagement; but I claim nothing novel in the mechanism for shipping either the chain-wheel or the ring T. The movement of the ring T operates upon the arm of a bell-crank lever, Y, pivoted to the chain-wheel, the opposite arm of which projects between the two spring-pawls, and serves to throw alternately one of them out of engagement with the ratchet, when the spring of the other throws it into engagement. When going in one direction it will be necessary for the driver of a street-car to pull the rope X so as to set the proper pawl into engagement with the ratchet, and when going in the opposite direction it is necessary to pull the rope in the opposite direction and set the opposite pawl into engagement.

The operation with this construction and arrangement of parts is as follows: Suppose the car-axle to be rotating in the direction of the arrow, Fig. 2, the wheel G will then be rotated by the connecting-gearing in the opposite direction. If it is desired to stop the car, the spring-pawls being properly set for the direction of travel, the driver will throw the chain-wheel into engagement with the wheel G, which will communicate its motion to the chain-wheel, winding up the chain and contracting the spring L, the tension of which, communicated through the wheel G and intermediate gearing to the axle, tends to stop its rotation. Supposing the car-axle to be thus stopped, it is obvious that the strain of the chain, with the parts engaged as described, would be in the opposite direction to that in which it would be desired to start the car forward again. Consequently, in order that the spring may now exert its force to assist forward motion instead of resisting it—in other words, in order that it may operate as a starter instead of as a brake—it will be necessary for the driver to shift the chain-wheel out of engagement with the wheel G, when it will tend to rotate in the direction indicated by its arrow—that is to say, in the forward direction of the car-axle—and the proper pawl will instantly engage with the ratchet and communicate the strain of the spring directly to the car-axle.

As above stated, when my improvements are applied to cars they are duplicated, as shown in the drawings, and the mechanism for shipping the chain-wheel and the ring T is connected together so as to operate upon the front and rear axles simultaneously, and so as to be capable of operation by the driver from either end of the car. Thus my improvements apply when running the car in opposite directions, and they may be made to apply also with equal facility when running up or down hill by the proper shifting of the spring-pawls.

Of course in going uphill no brake is required for stopping, and the pawls would then be set only to resist the tendency of gravity to cause the car to back down, and the opposite would be the case in going downhill.

It will be observed that the conical cavity in the side of the wheel G and the corresponding inclined periphery of the chain-wheel give a wedging contact, which renders the frictional engagement of the parts very efficient It will also be observed that the width of the ratchet-wheel and pawls is such as to allow of the proper play of the pawls with the chain-wheel in the direction of the car-axle over the surface of the ratchet.

In order that the pawl which happens to be set for work may not drag over the ratchet-teeth and be noisy and subject to injurious wear, the swing of the pawls should be such as that both may be set to clear the ratchet at the same time. In order to provide for this operation it will only be necessary that the pawl-setting rope be pulled a short distance, producing an effect analogous to that of a half-cock of a gun-hammer. There are already in existence various well-known catches and other devices which would enable the pull of the cord to be regulated in that manner, which it is unnecessary to describe. Simply knots in the pull-rope and suitable catches for them attached to the car would, for example, serve the purpose.

Having thus described my invention, what I claim, and desire to secure by Letters Patent, is—

1. The combination, with a car-axle, of the spur-wheels B C G and the sliding chain-wheel I, and ratchet-and-pawl mechanism working within the conical socket of the wheel G, substantially as described.

2. The combination, with the chain-wheel carrying the pivoted spring-pawls, the ring T, and pawl-shipping lever Y, of the ratchet-wheel fixed to the car-axle, substantially as described.

HERMON HINCKLEY.

Witnesses:
 F. N. PAGE,
 DAVID REID.